United States Patent
Lee

(12) 
(10) Patent No.: US 6,744,754 B1
(45) Date of Patent: Jun. 1, 2004

(54) CONTROL OF FORWARD LINK POWER CDMA MOBILE COMMUNICATION SYSTEM

(75) Inventor: Young Jo Lee, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,737

(22) Filed: Dec. 31, 1998

(30) Foreign Application Priority Data

Jun. 9, 1998 (KR) ........................................ 1998/21341

(51) Int. Cl.$^7$ ................................................ H04Q 1/00
(52) U.S. Cl. ........................ 370/342; 370/332; 370/252; 455/522; 455/442
(58) Field of Search .............................. 370/332, 342, 370/252, 329; 455/522, 69, 442

(56) References Cited

U.S. PATENT DOCUMENTS

| | | | | |
|---|---|---|---|---|
| 5,093,840 A | * | 3/1992 | Schilling .................... | 455/522 |
| 5,383,219 A | * | 1/1995 | Wheatley et al. ........... | 370/342 |
| 5,396,516 A | | 3/1995 | Padovani et al. ........... | 375/225 |
| 5,629,934 A | | 5/1997 | Ghosh et al. ................ | 370/335 |
| 5,771,451 A | * | 6/1998 | Takai .......................... | 455/522 |
| 5,771,461 A | * | 6/1998 | Love ........................... | 455/522 |
| 5,799,010 A | * | 8/1998 | Lomp et al. ................. | 370/342 |
| 5,842,114 A | * | 11/1998 | Ozluturk ...................... | 455/69 |
| 5,862,453 A | * | 1/1999 | Love ........................... | 455/522 |
| 5,884,187 A | * | 3/1999 | Ziv ............................. | 455/522 |
| 5,987,326 A | * | 11/1999 | Tiedemann et al. ......... | 370/331 |
| 5,991,329 A | * | 11/1999 | Lomp et al. ................. | 375/130 |
| 5,991,332 A | * | 11/1999 | Lomp et al. ................. | 375/152 |
| 6,101,168 A | * | 8/2000 | Chen .......................... | 370/342 |
| 6,307,849 B1 | * | 10/2001 | Tiedemann .................. | 455/522 |
| 6,493,330 B1 | * | 12/2002 | Miya et al. .................. | 370/335 |

FOREIGN PATENT DOCUMENTS

EP         0977371 A2   *   2/2000

* cited by examiner

Primary Examiner—Brian Zimmerman
(74) Attorney, Agent, or Firm—Fleshner & Kim, LLP

(57) ABSTRACT

An apparatus and a method for controlling forward link power in a CDMA mobile communication system is disclosed. The apparatus comprises a traffic channel correlator for performing a first correlation operation with respect to a code symbol of a CDMA signal received through a traffic channel, a pilot channel correlator for performing a second correlation operation with respect to a code symbol of the CDMA signal received through a pilot channel, a power control bit extractor for extracting a power control bit from the correlation value from the traffic channel which corresponds to a code symbol with a fixed transmission rate, a power estimator for estimating the average of reception power in response to the power control bit extracted by the power control bit extractor and the correlation value from the pilot channel correlator, a comparator for comparing the average reception power estimated by the power estimator with a predetermined power control reference value and generating a deviation of the average reception power from the predetermined power control reference value, and a power control bit generator for generating the final power control bit according to the deviation generated by the comparator.

49 Claims, 5 Drawing Sheets

(a)

(b)

(c)

CONTROL OF FORWARD LINK POWER CDMA MOBILE COMMUNICATION SYSTEM

BACKGROUND OF THE INVENTION

1. Field of the Invention

The present invention relates to a mobile communication system, and more particularly to the control of forward link power in a CDMA mobile communication system.

2. Description of the Prior Art

In a mobile communication system using a code division multiple access (CDMA), such as a cellular mobile communication system or a personal communication service system, a plurality of mobile stations transmits and receives frames via a base station or a cell-site. The communication path used by a base station to transmit data frames to a user is called a forward link. Conversely, the reverse link refers to the communication path used by a user to transmit data frames back to a base station.

Each of the frames is composed of symbols indicating a digitized voice and related data. These frames may fade during transmission through a multipath because reflections in the transmission environment as the mobile stations move. The frames may also fade by an interference of one specific mobile station with another mobile stations due to a high transmission power.

Also, if a certain mobile station is extremely low in power, the associated base station cannot recover the data of a frame transmitted from the mobile station, resulting in a loss of data. Thus, the base station has to control the frame transmission power of the mobile station to adequately recover the data of the transmitted frame while minimizing the fading of the transmitted frames.

For frame transmission power control, the base station is adapted to measure the transmission power of the frame transmitted from the mobile station and send a power control command to the mobile station according to the measured result. The power control command instructs the mobile station to adjust the transmission power through separate channels.

This power control command is composed of a transmission power increment bit or a transmission power decrement bit for maintenance of an average reception power.

FIG. 1 is a block diagram showing a portion of a conventional apparatus for controlling a reverse link power in a CDMA mobile communication system. A spread-band CDMA signal transmitted from a mobile station (not shown) is received at a receiving antenna 20 of a base station, generally through a reverse link CDMA channel. A radio frequency (RF) receiver 21 performs a frequency down process with respect to the received CDMA signal.

An analog/digital (A/D) converter 22 converts the CDMA signal frequency down-processed by the RF receiver 21 into a digital signal, and a PN correlator 23 performs a correlation process with respect to the digitized CDMA signal from the A/D converter 22 on the basis of a PN code provided from a PN code generator (not shown). The PN correlator 23 supplies an output signal to a decoder 24 which performs a decoding operation and to a power estimator 25 which estimates the average reception power of the mobile station transmitting the CDMA signal.

The decoder 24 decodes the output signal from the PN correlator 23 into a code symbol of the received CDMA signal and also supplies code error metrics indicating the quality of the received CDMA signal to an outer loop power controller 26. In response to the code error metrics from the decoder 24, the outer loop power controller 26 detects a sufficient power of the mobile station to transmit data and supplies a power control reference value for the control of reverse link power to a comparator 27.

The comparator 27 compares the average reception power of the mobile station estimated by the power estimator 25 with the power control reference value from the outer loop power controller 26 and supplies a deviation of the average reception power from the power control reference value to a power control bit generator 28. The power control bit generator 28 generates a reception power increment bit or a reception power decrement bit according to the deviation supplied from the comparator 27 and provides the generated reception power increment bit or reception power decrement bit to a transmitter 29.

The transmitter 29 transmits the reception power increment bit or reception power decrement bit from the power control bit generator 28 together with the frequency up-processed user data to the mobile station through a transmitting antenna 30 while placing them on a traffic channel among the CDMA channels of a forward link.

The CDMA channels in the forward link are generally a pilot channel, a synchronous channel, a paging channel and a traffic channel for forward connection and communication from the base station to the mobile station. The CDMA signals through these CDMA channels are orthogonally processed based upon Walsh function codes and processed as orthogonal pairs of a pseudo noise (PN) sequence based upon a fixed chip rate such that the signals can be code-symbolized.

Generally, a CDMA signal may be transmitted at various rates of 9.6 kbps (full rate), 4.8 kbps (half rate), 2.4 kbps (quarter rate) and 1.2 kbps (eighth rate). The CDMA signal is also encoded in the mobile station. Typically, the CDMA signal is encoded into a frame at an interval of 20 msec. An error correcting code is used in the encoding process to automatically correct an error of the digital data.

Referring back to FIG. 1, the power control through the power estimator 25, the comparator 27 and the power control bit generator 28 forms a closed loop power control. In the closed loop power control, the base station measures a transmission rate-based reception power of a signal received from the mobile station, compares the measured reception power with a predetermined power control reference value and sends an appropriate power control command as a result of the measurement together with user data to the mobile station. Thus, the mobile station adjusts the transmission power in response to the sent power control command and transmit a signal at the adjusted transmission power.

In the closed loop power control, the power control reference value is determined differently for each mobile stations depending on various parameters such as the moving speeds of the mobile station, the surroundings of the mobile stations, etc. Particularly, the outer loop power controller 26 in the base station adjusts the power control reference value appropriately according to a frame error rate of the received data. Such power control is called an outer loop power control.

As discussed above, the conventional power control of the CDMA mobile communication system is mainly a reverse link control. Particularly, the mobile station aids the base station in the control of the power on the forward channel by transmitting a power control message to the base station on the reverse link. The mobile station estimates the reception power and informs the base station via the power control message.

The base station may accordingly adjust the transmission power, i.e. the reception power at the mobile station, to each mobile station. Through the power control message, the base station may minimize the necessary transmission power to each individual mobile station for maintaining a link of a specified quality. By minimizing each transmission power, the total interference generated is also minimized, thereby improving the capacity of the system.

In the conventional CDMA mobile communication system, the mobile station evaluates its error performance and sends a power control message for each frame. Thus, the base station adjusts the transmission power output every frame or 50 Hz. The power output to each mobile station is updated on a frame by frame basis through a feedback mechanism from the mobile station to the base station. The feedback mechanism allows the mobile station to inform the base station on whether the frames are received correctly or incorrectly by including such information in every frame of data transmitted to the base station.

However, the conventional power control for the CDMA mobile communication system fundamentally limits the rate (50 Hz) in which a mobile station sends a power control message and the rate in which the base station adjusts the power out to the mobile station. A high speed transmission power adjustment would allow the base station to efficiently minimize the necessary transmission power to each individual mobile station for maintaining a link of a specified quality, thereby efficiently minimizing the total interference generated.

Thus, a high speed power control is required for a more efficient CDMA communication system. A forward link power control would allow a higher speed power control. For a high-speed forward link power control, a mobile station must measure the power of a CDMA signal received from a base station and determine which one of the CDMA channels is to be observed and used for the power control.

Assuming that a forward link power control is performed by observing the traffic channel similarly as the reverse link power control, the following problem occurs. Namely, the traffic channel of the forward link is variable in transmission power according to a transmission rate. As the data transmission rate changes, the base station changes the transmission power by an amount equivalent to the change in the data transmission rate. Since the new frame rate is not known to the mobile station, the mobile station cannot distinguish whether the reception power changes are due to fading or rate changes.

For this reason, when the power control is performed by judging a transmission rate of a signal currently received from the mobile station, and calculating a signal-to-interference ratio according to the judged result, a considerable amount of transmission delay occurs. Thus the base station cannot follow the currently varying CDMA channel environments.

One method in the related art for estimating the reception power on the forward link utilizes punctured power control symbols. In this method, the power control message bits that are sent on the forward link to control the transmission power of the mobile station in the reverse link are punctured on the forward traffic channel at the rate of 800 Hz. The bits for power control message is fixed. As a result, the power control can be performed by observing the power control bit transmitted through the traffic channel. However, because the power control bit is very short in length, a significant error may arise in calculating an interference ratio to the currently received CDMA signal, resulting in an increase in the probability of an erroneous power control.

Moreover, a power control performed by observing the pilot channel rather than the traffic channel cannot be performed independently by the plurality of mobile stations belonging to the base station, because the pilot channel is commonly used by the mobile stations.

SUMMARY OF THE INVENTION

Accordingly, an object of the present invention is to solve at least the problems and disadvantages of the related art.

An object of the present invention is to provide a fast forward link power control in a CDMA mobile communication system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an apparatus for controlling forward link power in a CDMA mobile communication system comprises a traffic channel correlator performing a first correlation operation with respect to a code symbol of a CDMA signal received through a traffic channel; a pilot channel correlator for a second correlation operation with respect to a code symbol of the CDMA signal received through a pilot channel; a power control bit extractor extracting a power control bit from the code symbol received through the traffic channel, if the transmission rate remains consistent to a correlation value from the traffic channel correlator; a power estimator estimating the average of reception power in response to the power control bit extracted by the power control bit extractor and the correlation value from the pilot channel correlator; a comparator comparing the average reception power estimated by the power estimator with a predetermined power control reference value and generating a deviation of the average reception power from the predetermined power control reference value; and a power control bit generator generating the final power control bit according to the deviation generated by the comparator.

In another embodiment of the present invention, a method of controlling forward link power in a CDMA mobile communication system comprises the step of performing a forward link power control operation by using both a traffic channel and pilot channel of a forward link.

Preferably, the forward link power control operation is performed by using power control bits of code symbols transmitted through the traffic channel and the pilot channel for a predetermined time. Also, the forward link power control operation is performed by taking into consideration that a ratio of the traffic channel power to the pilot channel power obtained for a first predetermined time is equivalent to a ratio of the traffic channel power to the pilot channel power obtained for a second predetermined time.

In another embodiment of the present invention, the forward link power control operation may be performed by taking into consideration that a difference between the traffic channel power per a first predetermined time and the traffic channel power per a second predetermined time is equivalent to a difference between the pilot channel power per the first predetermined time and the pilot channel power per the second predetermined time.

In the present invention, a power control group observes code symbols transmitted through the traffic channel and pilot channel for a first predetermined time. The power control group is adapted to observe the code symbols for a second predetermined time where the probability that the code symbols are present is high. Moreover, the power control group is divided to perform a power estimation operation regarding the observed code symbols and other processes for a third predetermined time being equal to a difference of the second predetermined time from the first predetermined time.

In the present invention, a current power control group observes code symbols transmitted through the traffic channel and pilot channel for a first predetermined time. The current power control group is adapted to observe the code symbols for a second predetermined time where the probability that the code symbols are present is high and for a third predetermined time remaining after observation in a previous power control group. Moreover, the current power control group is divided to perform a power estimation operation regarding the observed code symbols and other processes for a fourth predetermined time remaining after observation in the current power control group. The third predetermined time is equal to a difference of the second predetermined time from the first predetermined time, and the fourth predetermined time is equal to the third predetermined time.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
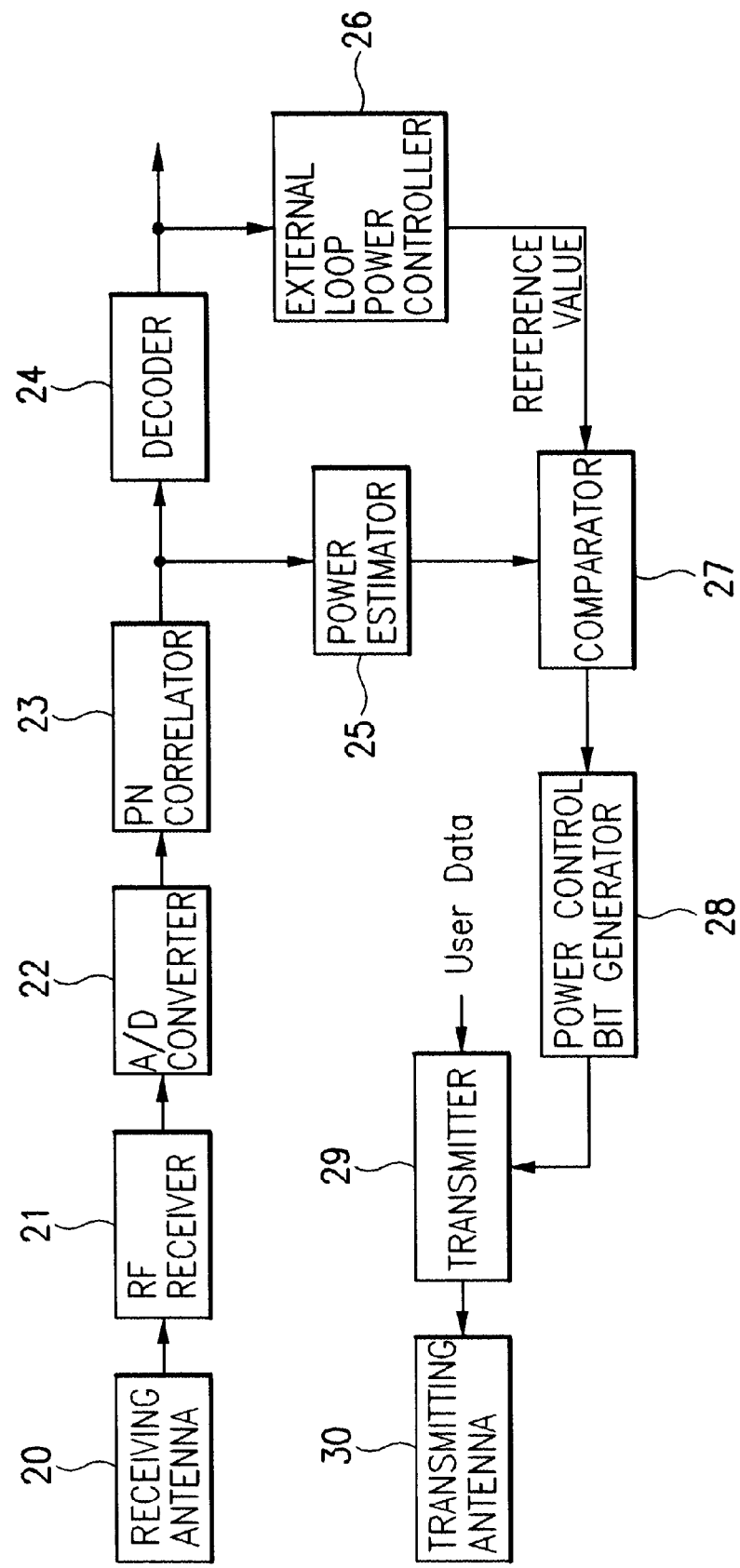
FIG. 1 is a block diagram showing a part of a conventional apparatus for controlling reverse link power in a CDMA mobile communication system.
Figure 2:
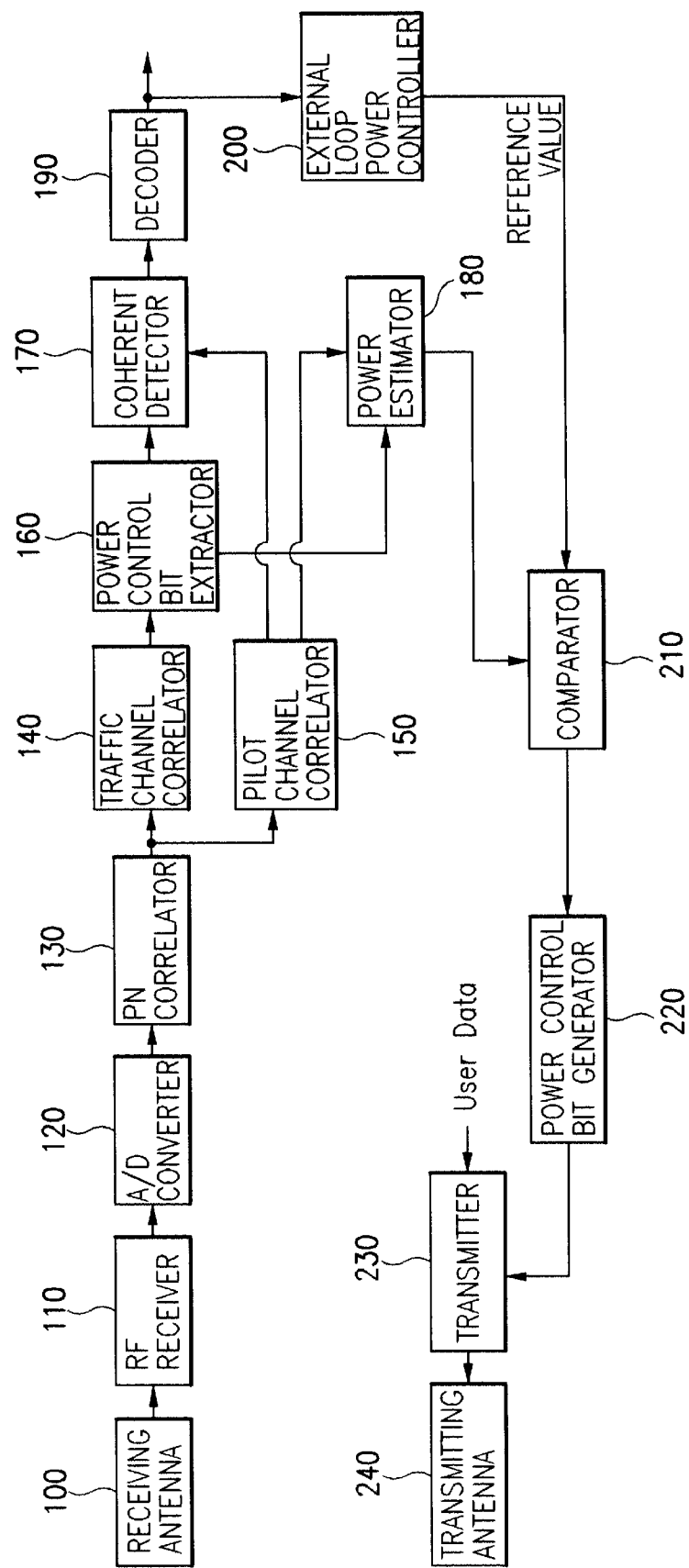
FIG. 2 is a block diagram showing a part of an apparatus for controlling forward link power in a CDMA mobile communication system according to the present invention.

FIG. 2 is a block diagram showing a part of an apparatus for controlling forward link power in a CDMA mobile communication system according to the present invention. The forward link power control apparatus of the present invention includes the same elements as the conventional reverse link power control apparatus in FIG. 1. Namely, the forward link power control apparatus comprises a receiving antenna 100, a RF receiver 110, an A/D converter 120, a PN correlator 130, a decoder 190, an outer loop power controller 200, a comparator 210, a power control bit generator 220, a transmitter 230 and a transmitting antenna 240.

However, the forward link power control apparatus according to the present invention further comprises a traffic channel correlator 140 performing a first correlation operation with respect to a code symbol of a CDMA signal received through a traffic channel; a pilot channel correlator 150 performing a second correlation operation with respect to a code symbol of the CDMA signal received through a pilot channel; a power control bit extractor 160 extracting a power control bit from the correlation value from the traffic channel which corresponds to a code symbol with a fixed transmission power in the base station; a coherent detector 170 detecting a code symbol to be decoded from the correlation values output by the traffic channel correlator 140 and by the pilot channel correlator 150; and a power estimator 180 estimating the average reception power of a mobile station in response to the power control bit extracted by the power control bit extractor 160 and the correlation value from the pilot channel correlator 150.

The operation of the forward link power control apparatus for the CDMA mobile communication system according to the present invention will be described in detail. A direct spread-band CDMA signal transmitted from a base station (not shown) is received at the receiving antenna 100 of a mobile station, generally through a CDMA channel. The RF receiver 110 performs a frequency down process with respect to the received CDMA signal. The CDMA signal through the CDMA channel is orthogonally processed based upon a Walsh function. The A/D converter 120 converts the CDMA signal frequency down-processed by the RF receiver 110 into a digital signal, and the PN correlator 130 performs a correlation process with respect to the digitized CDMA signal from the A/D converter 120 based upon a PN code provided from a PN code generator (not shown).

The traffic channel correlator 140 receives an output signal from the PN correlator 130 and performs the first correlation operation with respect to a Walsh function-based code symbol of the traffic channel. The pilot channel correlator 150 also receives the output signal from the PN correlator 130 and performs the second correlation operation with respect to a Walsh function-based code symbol of the pilot channel.

The power control bit extractor 160 extracts a power control bit from the correlation value from the traffic channel correlator 140 which corresponds to a code symbol with a fixed transmission power in the base station. The power control bit extractor 160 forwards the extracted power control bit to the power estimator 180. The power estimator 180 also receives a correlation value from the pilot channel correlator 150. The power estimator 180 estimates the average reception power of the mobile station transmitting the CDMA signal in response to the power control bit extracted by the power control bit extractor 160 and the correlation value from the pilot channel correlator 150.

The coherent detector 170 detects a code symbol to be decoded from the correlation values output by the traffic channel correlator 140 and by the pilot channel correlator 150. The decoder 190 decodes the code symbol detected by the coherent detector 170 and forwards the code error metrics indicating the quality of the received CDMA signal to the outer loop power controller 200.

In response to the code error metrics from the decoder 190 the outer loop power controller 200 calculates a sufficient power necessary by the mobile station to transmit the CDMA signal and determines a power control reference value for the forward link power control taking into consideration the calculated power necessary by the mobile station. The outer loop power controller 200 supplies the determined power control reference value to the comparator 210. The comparator 210 compares the average reception power of the base station estimated by the power estimator 180 with the power control reference value from the outer loop power controller 200 and supplies a deviation of the average reception power from the power control reference value to the power control bit generator 220.

The power control bit generator 220 generates a reception power increment bit or a reception power decrement bit according to the deviation supplied from the comparator 210 and provides either the generated reception power increment bit or reception power decrement bit to the transmitter 230. The transmitter 230 transmits the reception power increment bit or the reception power decrement bit from the power control bit generator 220 together with the frequency up-processed user data to the base station through the transmitting antenna 240.

As a result, the base station adjusts its reception power in response to the reception power increment/decrement command and sends the user data at the resultant transmission rate.

Figure 3:
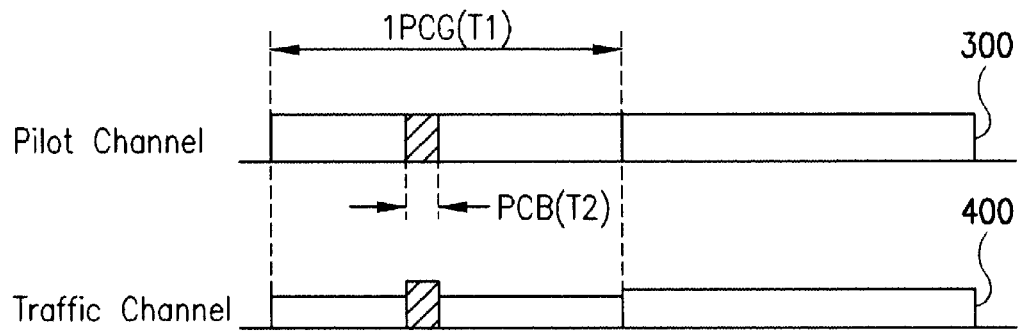
FIGS. 3(a) to (c) show power control groups for observing power control bits on a traffic channel and pilot channel according to the present invention.
Figure 3:
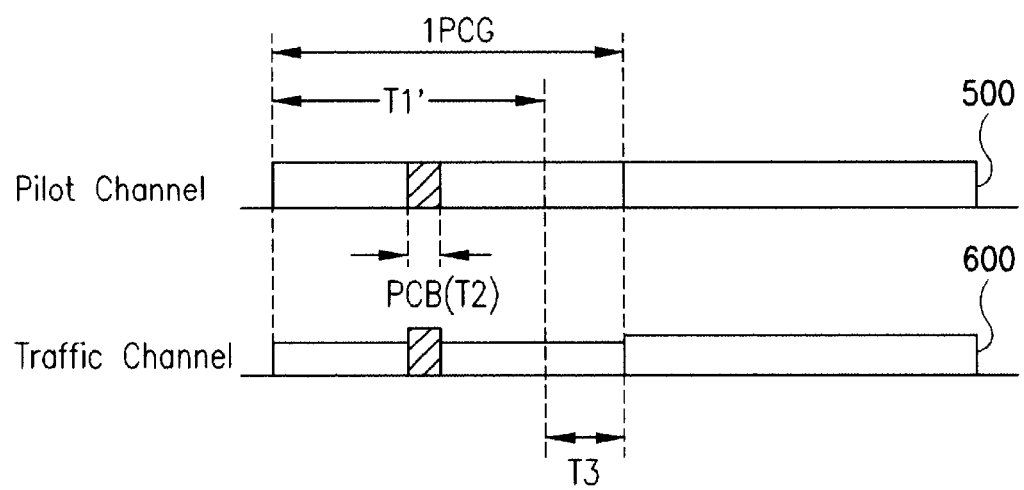
Figure 3:
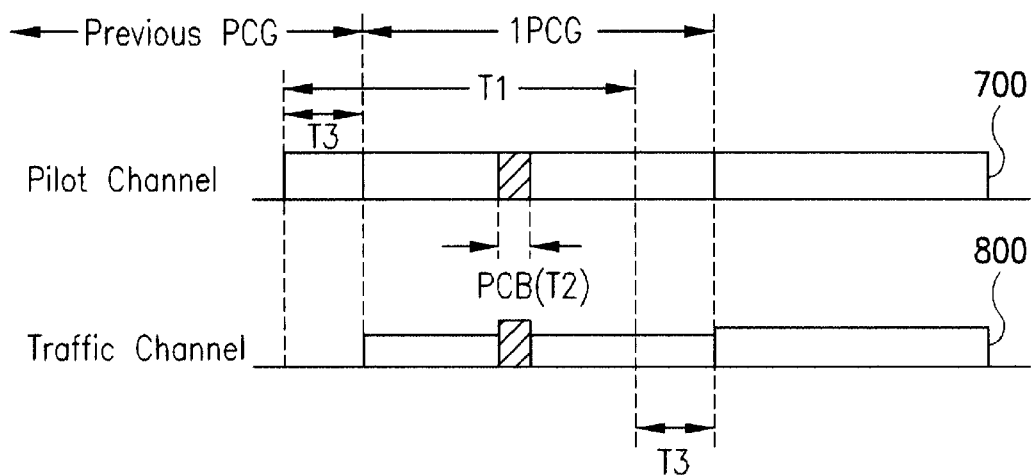

FIG. 3 shows power control groups for observing power control bits on the traffic channel and the pilot channel according to the present invention. Particularly, FIG. 3(a) is a view illustrating the estimation of power for the traffic channel. FIG. 3(b) is a view illustrating the estimation of power for the traffic channel using the time unused as an observation interval in a current power control group, according to the present invention. FIG. 3(c) is a view illustrating the estimation of power for the traffic channel using time unused as an observation interval in a previous power control group, according to the present invention.

Referring to FIG. 3(a), a time occupied by one power control group (PCG) is defined as T1, a time occupied by one power control bit (PCB) is defined as T2, a power for the pilot channel 300 during the occupied time T1 is defined as P(T1), a power for the pilot channel 300 during the occupied time T2 is defined as P(T2), a power for the traffic channel 400 during the occupied time T1 is defined as S(T1), and a power for the traffic channel 400 during the occupied time T2 is defined as S(T2).

The powers P(T1), P(T2) and S(T2) are values which may be calculated, but the power S(T1) cannot be calculated because the real time transmission rate of the traffic channel 400 is unknown. Particularly, the transmission power of the traffic channel 400 is varied according to a transmission rate of the CDMA signal. As a result, the power S(T1) must be inferred from the powers P(T1), P(T2) and S(T2).

A first method of inferring the power S(T1) is to assume that a ratio of P(T1) to S(T1) is equal to a ratio of P(T2) to S(T2). The following equation 1 is derived from such an assumption:

$$\frac{S(T1)}{P(T1)} = \frac{S(T2)}{P(T2)} \qquad \text{[equation 1]}$$

Using the above equation 1, the power S(T1) can be inferred as follows:

$$S(T1) = P(T1)\frac{S(T2)}{P(T2)} \qquad \text{[equation 2]}$$

A second method of inferring the power S(T1) is to use a difference between the power occupied during time T1 and the power occupied during time T2. From this inference, the following equation 3 can be derived:

$$\frac{S(T1)}{T1} - \frac{S(T2)}{T2} = \frac{P(T1)}{T1} - \frac{P(T2)}{T2} \qquad \text{[equation 3]}$$

Using the above equation 3, the power S(T1) can be inferred as follows:

$$S(T1) = P(T1) + \frac{T1}{T2}[S(T2) - P(T2)] \qquad \text{[equation 4]}$$

The power estimator 180 in FIG. 2 estimates the power S(T1) for the traffic channel 400 during the occupied time T1 using the equation 2 or equation 4. The estimated power S(T1) is compared with the power control reference value from the outer loop power controller 200. Thus, a power control bit is generated which corresponds to a difference between the power S(T1) and the power control reference value.

Because the ratio of S(T2)/P(T2) in the above equation 1 is an instantaneous value, the ratio may be significantly influenced by noise, resulting in a reduction in the accuracy. For this reason, the ratio of S(T2)/P(T2) obtained in the previous power control groups can be used to increase the accuracy. Particularly, the average of the ratios of S(T2)/P(T2) obtained in the previous power control groups is determined and used for the estimation of the reception power. Averaging the ratios of S(T2)/P(T2) obtained in the previous power control groups allows the added noise to be averaged out from the signal ratios erroneously obtained in the power control groups. As a result, the resultant ratio of S(T2)/P(T2) is less influenced by noise.

Figure 4:
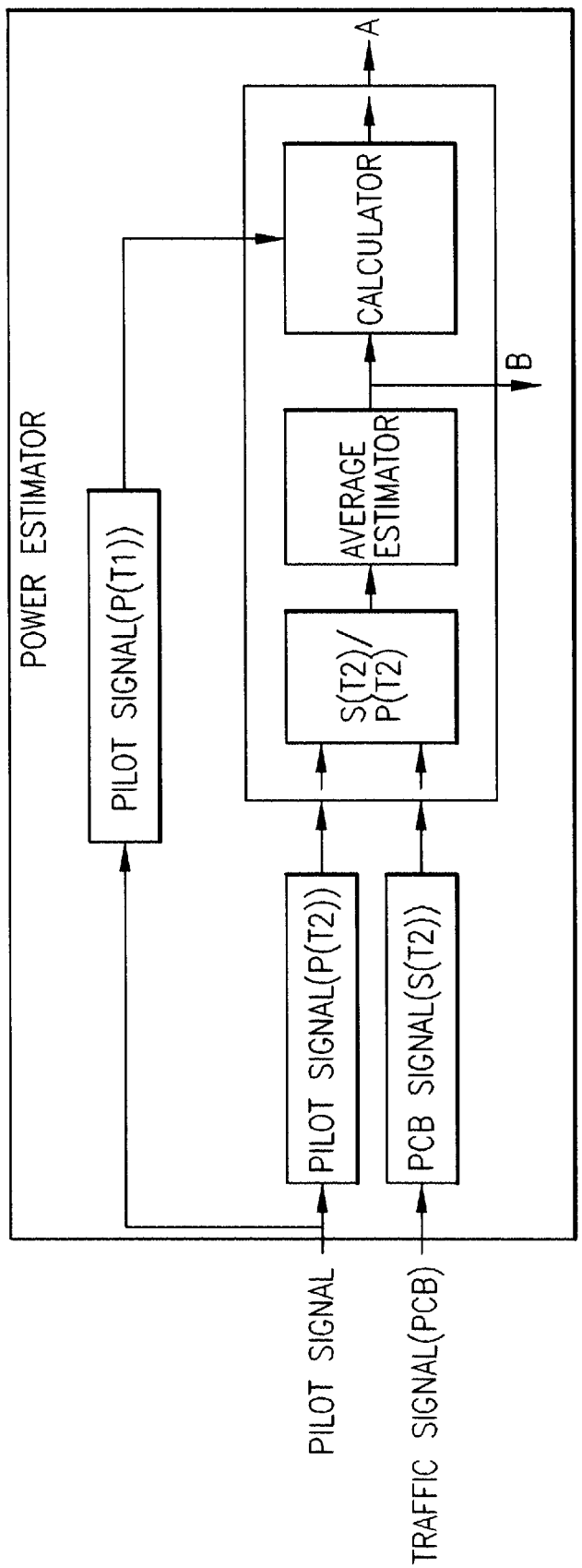
FIG. 4 is a block diagram of a power estimator including an average estimator according to the present invention.

FIG. 4 is a block diagram showing the construction of the power estimator 180 in FIG. 2 according to the present invention. As shown, the power estimator 180 includes an average estimator. First, a ratio of current traffic signal to current pilot signal is obtained by obtaining a ratio of values from the traffic channel correlator and the pilot channel correlator corresponding to the time T2.

The average estimator outputs the average of a signal ratio obtained during the time T2 and the previously obtained signal ratio. This average is less influenced by noise than the ratio of the traffic signal to the pilot signal ratio obtained in one power control group. If the average estimator provides its output directly without using a value obtained in the previous power control group, the operation can be performed simply based upon the signal ratios obtained in the respective current power control groups.

The average estimator employs a FIR filter-based LPF or an IIR filter-based LPF to take the average of S(T2)/P(T2). A signal extracted at point B in FIG. 4 is used for a case where only an accurate ratio of the pilot signal to the traffic signal is employed. A calculator in FIG. 4 can obtain the desired S(T1) value by applying an output value from the average estimator and a pilot signal value obtained during the time T1 to the equation 2. The resultant value appears at point A in FIG. 4 and the value is supplied to the comparator 210 in FIG. 2.

Figure 5:
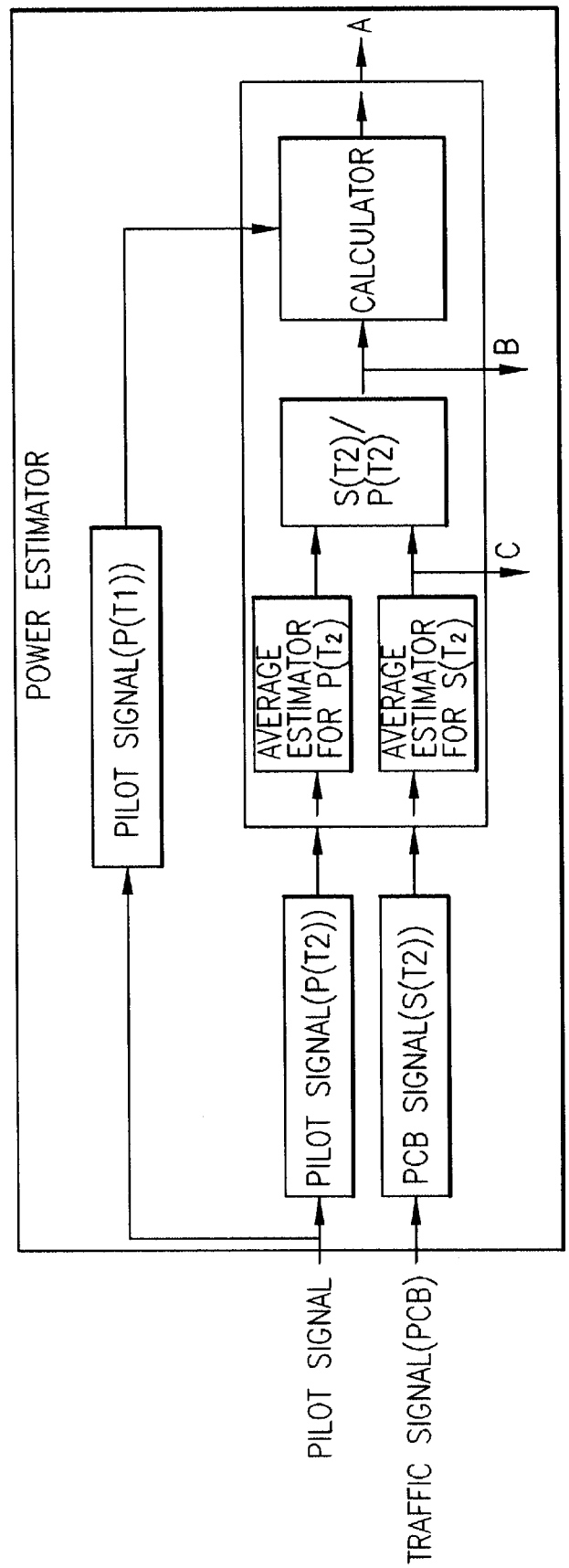
FIG. 5 is a block diagram of an alternative embodiment of a power estimator including an average estimator according to the present invention.

To obtain the average of a signal ratio obtained during the time T2 and the previously obtained signal ratio, the ratio S(T2)/P(T2) may first be obtained and averaged as in FIG. 4. In another embodiment, the average value of S(T2) and the average value of P(T2) may be first calculated to obtain a ratio of the averaged S(T2) to the averaged P(T2). FIG. 5 shows the second embodiment of the power estimator 180 in FIG. 2.

Referring to FIG. 5, the values P(T2) and S(T2) are individually averaged by the average estimator for P(T2) and the average estimator for S(T2). Thereafter, the ratio of the averaged S(T2) to the averaged P(T2) is obtained. The average estimator employs a FIR filter-based LPF or an IIR filter-based LPF to take the average of either S(T2) or P(T2).

A signal extracted at point B in FIG. 5 is used for a case where only an accurate ratio of the pilot signal to the traffic signal is employed. A calculator in FIG. 5 can obtain the desired S(T1) value by applying the obtained ratio and the pilot signal P(T1) obtained during the time T1 to the equation 2. The resultant value appears at point A in FIG. 5 and the value is supplied to the comparator 210 in FIG. 2. In this embodiment, a signal can be extracted at point C as shown in FIG. 5 for a case where only an accurate average of the traffic signal is required.

On the other hand, if the ratio of S(T2)/P(T2) is required once in a long time period such as one frame, rather than in each power control group, the ratio may be accumulated and averaged. Such averaging may be taken with respect to the accumulated ratios of S(T2)/P(T2) or the respective accumulated values of S(T2)/P(T2).

Referring again to FIG. 3(a), the current PCG is observed during the time T1 and the power estimation and other processes are performed in the next PCG during the next time T1. A currently generated PCB is appended and transmitted in the next PCG. Thus, the power estimation and other processes are performed using the previous observed power values.

Also, in FIG. 3(a), a PCB for the reverse link power control occupies a part of one PCG on the traffic channel 600. In the case of IS-95, the PCB is randomly present on the front ⅔ position of one PCG. Namely, provided that one PCG is divided into 24 parts, the PCB is positioned on any one of the front 16 parts.

Because the PCB is actually positioned on a front part of the PCG as shown in FIGS. 3(a) to 3(c), the occupied time T1 for detecting the power for the pilot channel 500 can be somewhat reduced by time T3 as shown in FIGS. 3(b) and (c). As a result, the power estimation and other processes can be performed during the saved time T3.

Because time T3 as shown in FIG. 3(b) can be saved from the time T1 in FIG. 3(a), the PCG is observed for the time of T1' or T1 minus T3 while the power estimation and other processes are performed during the time T3. Consequently, a PCB generated during the time of T1' is appended and transmitted in the subsequent PCGs, resulting in a reduction in time delay.

However, because the actual PCG time for the traffic channel is T1, transmitting the PCGs in time T1' effectively shortened observation time of the actual traffic channel. Thus, in FIG. 3(c), the time T3 unused as an observation interval in the previous PCG is included in the time T1' of the current PCG rather than performing the power estimation for a period of the T1' for the purpose of shortening the time delay. As a result, in the power estimation, the time delay can be reduced without shortening the occupied time T1.

As apparent from the above description, according to the present invention, the power is estimated from the code symbols of the CDMA signal received through the traffic channel and the pilot channel of the forward link. Thereafter, the power control bit is determined as a result of the power estimation. Therefore, the forward link power control between the mobile station and the base station can enhance the entire system performance.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for controlling forward link power in a CDMA mobile communication system, comprising:

a correlator unit performing a first correlation operation with respect to a received CDMA signal and outputting a first correlation value, and said correlator unit performing a second correlation operation with respect to the received CDMA signal and outputting a second correlation value;

a power control bit extractor extracting a traffic channel power control bit from the first correlation value which corresponds to a code symbol with a fixed transmission power in a base station; and a power estimator configured to estimate a traffic channel power according to ratio of a power of the power control bit to a pilot channel power, wherein the pilot channel power is obtained from the second correlation value during a traffic channel power control bit interval.

2. The apparatus of claim 1, wherein the correlator unit comprises:

a traffic channel correlator performing the first correlation operation and outputting the first correlation value; and a pilot channel correlator performing the second correlation operation and outputting the second correlation value.

3. The apparatus of claim 2, wherein said power estimator estimates an average of reception power of the traffic channel in response to a power of the extracted traffic channel power control bit and the second correlation value.

4. The apparatus of claim 3, wherein said power estimator comprises:

an average estimator calculating and outputting an average of signal ratios determined from the traffic channel power and the pilot channel power obtained during the traffic channel power control bit interval, and from at least one previous traffic channel power and at least one previous pilot channel power obtained during a previous traffic channel power control bit interval; and a calculator estimating the average of reception power in response to the average of signal ratios and in response to the second correlation value.

5. The apparatus of claim 4, wherein said average estimator employs one of either an FIR filter-based LPF or an IIR filter-based LPF to calculate the average of signal ratios.

6. The apparatus of claim 1, wherein the power control command generator comprises:

a comparator comparing the estimated average reception power estimated with the predetermined power control reference value and generating a deviation of the average reception power from the predetermined power control reference value;

a power control bit generator generating the power control bit according to the deviation generated by said comparator;

a coherent detector determining and forwarding code error metrics indicating the quality of the CDMA signal received through the traffic channel; and an outer loop power controller determining the predetermined power control reference value in response to the code error metrics.

7. The apparatus of claim 1, wherein the first correlation value comprises a traffic channel signal and wherein the second correlation value comprises a pilot channel signal.

8. A method of controlling forward link power in a CDMA mobile station (MS), comprising:
receiving signals over a traffic channel and a pilot channel by a MS over the forward link;
measuring a power of the pilot channel and a power of a power control bit of the traffic channel;
estimating a power of the traffic channel of the forward link based upon the power of the power control bit on the traffic channel and the power of the pilot channel at the mobile station; and
performing forward link power control based upon the estimated power of the traffic channel, wherein estimating a power of the traffic channel is performed by using a ratio of the power of the power control bit received on the traffic channel and the power of the traffic channel in a full rate transmission transmitted by a base station.

9. A mobile station of a CDMA communication system, comprising:
means for communicating with a CDMA communication system;
a power estimator, configured to estimate an average reception power based on an estimated power of a traffic channel and a power of the pilot channel; and
a power control command generator configured to generate a power control bit according to the average reception power estimated by the power estimator and a prescribed power control reference value, wherein the power control bit is transmitted to a base station to control a forward link power in a CDMA mobile communication system, wherein said power estimator comprises
a ratio determinator configured to determine a signal ratio of a traffic channel power to a pilot channel power, wherein the traffic channel power and the pilot channel power are obtained from the first correlation value and the second correlation value, respectively;
an average estimator configured to calculate and output an average of signal ratios determined from the traffic channel power and the pilot channel power; and
a calculator configured to estimate the average of reception power in response to the average of signal ratios and the second correlation value.

10. The mobile station of claim 9, wherein the traffic channel power and the pilot channel power are obtained from the first correlation value and the second correlation value, respectively, during the traffic channel power control bit interval.

11. The mobile station of claim 9, wherein the average estimator is configured to calculate and output the average of signal ratios determined from the traffic channel power and the pilot channel power, and from at least one previous traffic channel power and at least one previous pilot channel power obtained during a previous traffic channel power control bit interval.

12. A method for controlling forward link power in a CDMA mobile communication system, comprising:
performing a first correlation operation with respect to a code symbol of a CDMA signal received through a traffic channel and outputting first correlation value;

performing a second correlation operation with respect to a code symbol of the CDMA signal received through a pilot channel and outputting second correlation value;
estimating a power of the traffic channel in response to the first correlation value and the second correlation value; and
generating a power control bit according to the estimated traffic channel power and according to a predetermined power control reference value, wherein estimating the power of the traffic channel is performed by using a ratio of a power of a power control bit received on the traffic channel and a power of the traffic channel in a full rate transmission transmitted by a base station.

13. The method of claim 12, further comprising
extracting a traffic channel power control bit from the first correlation value which corresponds to a code symbol with a fixed transmission power in a base station.

14. The method of claim 13, wherein extracting the traffic channel power control bit further comprises:
detecting and extracting the traffic channel power control bit from a period less than one power control group interval; and
performing other steps such as estimating the average of reception power during a period remaining within one power control group interval after detecting and extracting the traffic channel power control bit.

15. The method of claim 13, wherein extracting the traffic channel power control bit further comprises:
detecting and extracting the traffic channel power control bit from a period equivalent to a combination of a portion of a current power control group interval and a portion of a previous power control group interval remaining after detecting and extracting a previous traffic channel power control bit; and
performing other steps such as estimating the average of reception power during a period remaining within the current power control group interval after detecting and extracting the traffic channel power control bit.

16. The method of claim 13, wherein estimating the power traffic channel further comprises:
determining a signal ratio of the traffic channel power to a pilot channel power, obtained from the first correlation value and the second correlation value, respectively, during the traffic channel power control bit interval;
calculating and outputting an average of signal ratios determined from the traffic channel power and the pilot channel power obtained from the traffic channel power control bit interval, and from at least one previous traffic channel power control bit and at least one previous pilot channel control bit obtained from a previous traffic channel power control bit interval; and
estimating the traffic channel power in response to the average of signal ratios and in response to the second correlation value.

17. The method of claim 16, wherein calculating the average of signal ratios employs one of an FIR filter-based LPF and an IIR filter-based LPF.

18. The method of claim 12, wherein generating the power control bit comprises:
comparing the traffic channel reception power estimated with the predetermined power control reference value and generating a deviation of the traffic channel power from the predetermined power control reference value.

19. A mobile station of a CDMA mobile communication system, comprising:

a receiving antenna receiving a spread-band CDMA signal transmitted from a base station;

a RF receiver performing a frequency down process with respect to the received CDMiA signal;

an A/D converter converting the CDMA signal frequency down-processed by the RF receiver into a digital signal;

a PN correlator performing a correlation process with respect to the digitized CDMA signal from the A/D converter based upon a PN code;

a correlator unit performing a first correlation operation with respect to a code symbol of a CDMA signal received through a traffic channel and outputting first correlation value, and said correlator unit performing a second correlation operation with respect to a code symbol of the CDMA signal received through a pilot channel and outputting second correlation value;

a power control bit extractor configured to extract a traffic channel power control bit from the first correlation value;

a power estimator configured to estimate a traffic channel power according to ratio of a power of the power control bit to a pilot channel power, wherein the pilot channel power is obtained from the second correlation value during a traffic channel power control bit interval; and a power control command generator generating a power control bit according to the traffic channel power estimated by said power estimator and according to a prescribed power control reference value.

20. The apparatus of claim 19, further comprising:

a coherent detector determining and forwarding code error metrics indicating the quality of the CDMA signal received through the traffic channel; and an outer loop power controller determining the predetermined power control reference value in response to the code error metrics.

21. A mobile station of a CDMA communication system, comprising:

means for communicating with a CDMA communication system;

a power estimator, configured to estimate a power of a traffic channel according to a power of a reverse power control bit received from a base station on the traffic channel and a power of the traffic channel in a full rate transmission;

a comparator configured to compare the estimated power of the traffic channel to a reference value; and a power control command generator configured to generate a forward power control bit according to an output of the comparator, wherein the forward power control bit is transmitted to a base station to control a forward link power; and a correlator unit configured to perform a first correlation operation of a received CDMA signal to output a traffic channel signal, and further configured to perform a second correlation operation of the received CDMA signal, to output a pilot channel signal, wherein the first correlation value and the second correlation value are provided to the power estimator to perform the power estimation.

22. The mobile station of claim 21, wherein the power estimator is further configured to estimate the power of the traffic channel according to a ratio of the power control bit of the traffic channel to the power of the pilot channel.

23. The mobile station of claim 21, wherein the correlator unit comprises:

a traffic channel correlator configured to perform a first correlation operation and output the traffic channel signal; and a pilot channel correlator configured to perform a second correlation operation and output the pilot channel signal.

24. The mobile station of claim 21, further comprising a power control bit extractor configured to receive the traffic channel signal from the correlator unit and to extract a power control bit from the traffic channel signal.

25. The mobile station of claim 21, further comprising:

a receiving antenna configured to receive a spread-band CDMA signal transmitted from a base station;

an RF receiver configured to perform a frequency down process with respect to the received CDMA signal;

an A/D converter configured to convert the CDMA signal frequency down-processed by the RF receiver into a digital signal; and a PN correlator configured to perform a correlation process wvith respect to the digitized CDMA signal from the A/D converter based upon a PN code.

26. A method of controlling forward link power in a CDMA mobile communication system, comprising:

measuring a pilot channel power of a forward link at a mobile station to estimate a time-varying path loss;

measuring a power of a power control bit of a traffic channel of the forward link;

estimating a traffic channel power of the forward link at the mobile station using a ratio of the power of the power control bit received on the traffic channel and the power of the traffic channel in a full rate transmission transmitted by a base station; and generating a power control bit at the mobile station to control the forward link power based on the estimated traffic channel power and a prescribed power control reference value.

27. The method of claim 26, wherein pilot to traffic channel power ratios for a plurality of previous power control groups are averaged to determine an average pilot to traffic channel power.

28. The method of claim 26, wherein estimating a pilot to traffic channel power ratio is performed once per power control group.

29. The method of claim 26, wherein the power of the traffic channel of the forward link is estimated by multiplying a first received power of the traffic channel, measured during a time occupied during one power control bit, by a ratio of (i) a power of the pilot during a power control group period, to (ii) a power of the pilot during the one power control bit.

30. The method of claim 26, wherein the measured pilot channel power is a received pilot channel power.

31. A method of controlling forward link power in a CDMA mobile station (MS), comprising:

receiving signals over a traffic channel and a pilot channel by a MS over the forward link;

measuring a power of the pilot channel and a power of a power control bit of the traffic channel;

estimating a power of the traffic channel of the forward link based upon the power of the power control bit on the traffic channel and the power of the pilot channel at the mobile station; and performing forward link power control based upon the estimated power of the traffic channel.

32. The method of claim 31, wherein performing the forward link power control further comprises obtaining a signal power ratio in a prescribed power control bit interval of code symbols transmitted through the traffic channel and the pilot channel and using at least two previous signal power ratios obtained in a previous prescribed power control bit interval.

33. The method of claim 31, further comprising measuring a pilot channel power at the mobile station to estimate a time-varying path loss.

34. The method of claim 31, further comprising estimating a traffic channel power at the mobile station to determine a pilot to traffic channel power ratio.

35. The method of claim 34, further comprising measuring a pilot channel power at the mobile station to estimate a time-varying path loss.

36. The method of claim 34, wherein pilot to traffic channel power ratios for a plurality of previous power control groups are averaged to determine an average pilot to traffic channel power.

37. The method of claim 31, further comprising generating a power control bit at the mobile terminal based on the traffic channel and the pilot channel.

38. The method of claim 31, further comprising comparing a ratio of a power of the traffic channel to a power of a power control bit on the traffic channel to perform the forward link power control.

39. The method of claim 38, wherein the ratio of a power of the traffic channel to a power of a power control bit on the traffic channel is transmitted by the base station.

40. The method of claim 31, further comprising comparing a power of a power control bit received on the traffic channel to a power of the traffic channel.

41. The method of claim 40, wherein a difference between the power of the power control bit received on the traffic channel and the power of the traffic channel is determined.

42. The method of claim 40, wherein a ratio of the power of the power control bit received on the traffic channel and the power of the traffic channel is determined.

43. The method of claim 31, wherein performing the forward link power control further comprises using an inference that a first ratio of the traffic channel power to the pilot channel power obtained for a first prescribed period of time is equal to a second ratio of the traffic channel power to the pilot channel power obtained for a second prescribed period of time.

44. The method of claim 43, wherein the traffic channel power is estimated using the equation $$PT1 = PP1(PT2/PP2),$$

wherein PT1 is the traffic channel power for the first prescribed period of time, PP1 is the pilot channel power for the first prescribed period of time, PT2 is the traffic channel power for the second prescribed period of time, and PP2 is the pilot channel power for the second prescribed period of time.

45. The method of claim 44, wherein traffic channel power for a plurality of previous power control groups are averaged to determine an average traffic channel power.

46. The method of claim 31, wherein performing the forward link power control further comprises using a signal power ratio in a prescribed power control bit interval of code symbols transmitted through the traffic channel and the pilot channel.

47. The method of claim 31, further comprising estimating the power of the traffic channel using a ratio of a power of the pilot channel to a power of a power control bit on the traffic channel.

48. The method of claim 31, wherein performing the forward link power control further comprises using power control bits of code symbols transmitted through the traffic channel and the pilot channel for a prescribed period of time.

49. The method of claim 48, wherein a power of the power control bit is used to perform power control of the mobile station.

* * * * *